Oct. 6, 1942.   W. H. ANDERSON ET AL   2,297,681
HYDRAULIC BOOSTER SYSTEM
Filed May 14, 1941
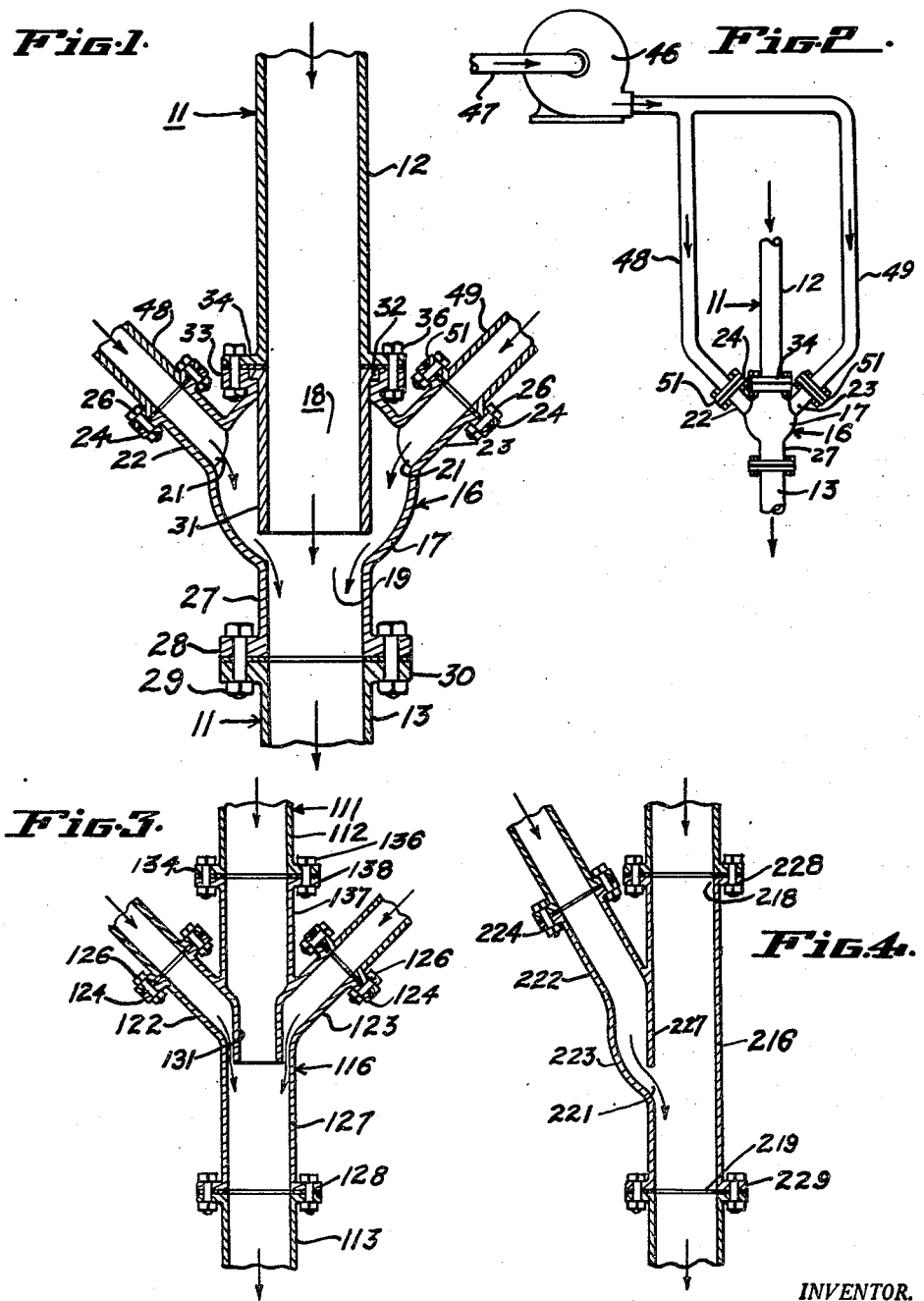
INVENTOR.
WILLIAM HERBERT ANDERSON
NORMAN R. STANTON
BY
Arlington E. White
ATTORNEY.

Patented Oct. 6, 1942

2,297,681

UNITED STATES PATENT OFFICE 2,297,681

HYDRAULIC BOOSTER SYSTEM

William Herbert Anderson and Norman R. Stanton, Oakland, Calif.

Application May 14, 1941, Serial No. 393,450

2 Claims. (Cl. 103—262)

The invention, in general, relates to means for transmitting fluids, semi-solids or liquids through pipe lines or conduits, and more particularly relates to a system for increasing pressure in a flowing stream of material in a pipe to increase its velocity and to enable the transmission of the material to increased distances.

While the booster system of our invention is entirely suitable for adaptation to a variety of industrial applications including the transmission of oil and gas through pipe lines for relatively great distances, the system has been especially designed for adaptation to dredging operations for conveying mud or the "spoil" to ever increasing distances from the location of the dredge.

A primary object of our invention is to provide an improved hydraulic booster system affording increased velocity of a stream of liquid, fluid or semi-solids in a pipe without setting up appreciable back pressure or eddy currents to disturb the flow.

Another object of the present invention is to provide a novel booster unit which is readily detachably connected into a pipe line at any desired point.

A still further object of our invention is to provide an improved booster unit for liquid, semisolid or fluid transmission conduits which incorporates therein means for keeping eddy currents as well as back pressure at the point of introduction of a hydraulic booster medium to a minimum.

Another object of the invention is to provide a hydraulic booster system which is relatively inexpensive to operate, manufacture, install and maintain.

A still further object of our invention is to provide an improved booster unit which reduces to a minimum the necessity for shut downs for the rehabilitation and repair of pumps in the system.

The foregoing and other objects are attained in the preferred and certain modified embodiments of our invention which are illustrated in the accompanying drawing. It is to be understood that we are not to be limited to the precise embodiments shown, nor to the precise arrangements of the several parts thereof, as our invention, as defined in the appended claims, can be embodied in a plurality and variety of forms.

Referring to the drawing:

Figure 1 is a sectional elevational view of a booster unit forming a part of a preferred embodiment of our invention.

Figure 2 is a plan view of a preferred embodiment of the booster system of our invention.

Figure 3 is a sectional elevational view of a modified embodiment of booster unit applicable to our system.

Figure 4 is a sectional elevational view of still another modified embodiment of a booster unit applicable to our hydraulic booster system.

In its preferred form, the hydraulic booster system of our invention preferably comprises, in combination with an extensible, sectional pipe line for conveying a liquid, a semi-solid, a fluid or other material, a pump for introducing a stream of a liquid under pressure into a stream of material flowing in such a pipe line, together with a booster member adapted to be detachably connected into said pipe line; said member comprising a unitary structure including a bell having a main inlet and a main outlet which are coaxial with the pipe sections of the line, as well as having a side inlet in communication with said pump, and a nipple supported within said bell extending from said main inlet past said side inlet to a point adjacent to said main outlet.

As particularly illustrated in Figures 1 and 2 of the drawing, the preferred embodiment of our invention for adaptation to a pipe line 11 consisting of a plurality of pipe sections 12 and 13 adapted to be connected together includes a booster unit, designated generally by the reference numeral 16, which is interposed in the line at the juncture of two pipe sections, as shown. It is to be understood, of course, that for relatively long pipe lines 11 a plurality of booster units 16 may be connected into the line for enabling the transmission of the material carried by the line to ever increasing distances from a given source. Preferably, each booster unit 16 comprises a casting in which is formed a hollow body 17, conveniently termed a "bell" herein, having a main inlet 18 and a main outlet 19 which are axially aligned with respect to one another as well as with respect to the pipe sections of the line 11. The bell 17 also is formed with one or more side inlets 21 and is extended laterally at these side inlets to provide short pipe connections 22 and 23 each carrying suitable means, such as apertured flanges 24 for enabling ready connection of the bell 16, by means of screw-bolts 26 piercing the flanges 24, to conduits or pipe sections hereinafter described. The booster casting 16 also is formed with an integral pipe connection 27 extending from the main outlet 19, such pipe connection also being conveniently provided with an apertured annular flange 28 to enable ready coupling of the bell 16, by means of screw-bolts 29, to one of the pipe sections 13 of the line 11 which normally carries a complementary flange 30 for this purpose. A suitable gasket, of course, can be inserted between the flanges 28 and 30 to insure against leakage.

In addition to the foregoing elements, the preferred embodiment of our invention includes a relatively long nipple 31 which is supported within the bell 17 and which extends from the main inlet 18 thereof to a point adjacent to the main outlet 19 thereof. In order that the nipple 31 be rigidly supported in position, we provide a flange 32 thereon which is inserted between a flange 33 formed on the bell 17 and a flange 34 carried by the pipe section 12 of the line 11, the two flanges being detachably fastened together by means of screw-bolts 36. Suitable gaskets are provided between the top of the flange 32 of the nipple 31 and the flange 34 of the pipe section 12 to seal these joints against leakage.

In accordance with our invention, means are provided for establishing communication between a source of liquid and the side inlets 21 of the bell 17 of the booster unit 16, and for delivering liquid from such source under pressure into a stream of material that may be flowing in pipe line 11 whereby the velocity of the latter stream is increased thus affording transmission of the material in the main pipe line 11 through extended distances. To this end, we provide an ejector pump 46 which preferably is of the centrifuge type, and we furnish a pipe section 47 leading between a source of liquid, such as a river or lake, not shown, and the inlet side of pump 46. We also provide a Y connection consisting of pipe sections 48 and 49 leading from the outlet of the pump 46 to opposite sides of the bell 17; it being understood, of course, that if a bell with only one side inlet 21 is utilized a single pipe section or conduit leading from the pump outlet to the bell will suffice. Each of the pipe sections 48 and 49 carries at its outer end a suitable apertured flange 51 in order that ready connections can be made to the flanges 24 of the pipe connections 22 and 23 extending from and communicating with the side inlets 21 of bell 17. It is to be especially observed that pipe connections 22 and 23 are so disposed on bell 17 that liquid delivered thereto from pump 46 is fed into the bell substantially in the same direction of flow as the direction of flow of the main stream flowing in the main line 11 and that, by virtue of the extended nipple 31 within the bell, no appreciable eddy currents or back pressure is set up to disturb the velocity of the main stream but, rather, such velocity is augmented. Moreover, that the liquid delivered by pump 46 is introduced into the main stream at a velocity always in excess of the rate of flow of the main stream so as to afford the transmission of the main line material to increased distances. It is to be appreciated that any number of pipe sections leading from pump 46 to the bell 17, and a corresponding number of side inlets 21 can be provided in the bell as is desired, or a pump 46 of a desired increased capacity can be utilized with either one or a plurality of pipe sections leading to the bell, in order to enhance or augment the velocity of the material flowing in the main pipe line 11. It is contemplated that for relatively long pipe lines 11, and when sources of extraneous water, such as water in rivers or lakes, are available, a series of booster units 16, together with accompanying pumps 46 and attendant pipe sections, are to be employed in the system.

In general, practically all booster systems heretofore used in dredging operations employ the same material or "spoil" through the booster pump which passes through the main dredge pump and, as a result, there is considerable wear and tear upon the booster pump because of the inherent nature of the "spoil" which contains pebbles, small rocks and other rough material in the extracted mud or sludge. Naturally, frequent overhauling of the booster pumps to the same extent as to the main dredge pumps are required. Due to the utilization of clear, clean water through the booster pump 46 of our improved system, operating expenses of the booster in dredging are cut to an exceedingly small figure. It may be added that our system is entirely applicable for incorporation into pipe lines for transmitting oil for great distances between sources thereof and refineries and between the latter and points of storage. In this connection, it is only necessary to provide a by-pass from the main pipe line leading to the inlet of pump 46 in order to deliver the by-passed oil back into the line at an increased velocity at the point where the booster unit 16 has been interposed in the line, thus augmenting the velocity of the stream of oil flowing in the main line.

In Figure 3 of the drawing, we have illustrated a modified embodiment of a booster unit, which is designated generally by the reference numeral 116 and which is adapted to be detachably connected into a main pipe line, indicated generally by the reference numeral 111 and consisting of a plurality of pipe sections 112 and 113. In this modification, the bell is omitted and we preferably so cast the booster unit as to form a pair of inclined pipe connections 122 and 123 each of which carries an annular flange 124 for connecting the unit, by means of screw-bolts 126, to the flanges of pipe sections hereinafter mentioned. The casting 116 also includes an integral pipe connection 127 of larger diameter than the pipe connections 122 and 123 and extending therefrom to form a Y; the pipe connection 127 having a suitable flange 128 thereon to enable detachable connection of the unit to one of the pipe sections 113 of the main line 111. Integral with the pipe connections 122 and 123 is a nipple 131 of smaller diameter than such pipe connections, than pipe sections 112 and 113 as well as than pipe connection 127 and extending thereinto a short distance. We also so form the casting 116 as to provide thereon a short pipe connection 137 which carries a flange 138 to enable ready attachment of the unit to the other pipe section 112 of the main line 111 through the medium of screw-bolts 136 and a complementary flange 134 carried by pipe section 112. The pipe connections 122 and 123 of the booster unit 116 are detachably fastened to and placed in communication with pipe sections leading to the outlet of a suitable pump, the inlet of which is supplied with water from a source thereof, all not shown.

A further modification of a booster unit adaptable for use in our improved booster system is depicted in Figure 4 of the drawing. In this modification the bell also is omitted and we provide a relatively short pipe connection 216 having a main inlet 218 and a main outlet 219, the pipe connection being of the same diameter as that of the pipe sections of the main line into which the same is detachably connected.

Pipe connection 216 also is provided with one or more relatively small side inlets 221, and we form one or more inclined, laterally extending pipe connections 222 integral with pipe connection 216 which are provided with flanges 224 and which communicate with the side inlets 221. In this modification, and because of the relatively small side inlets 221, the lateral extending pipe connections 222 are enlarged adjacent to the inlets 221, as indicated at 223, so that the velocity of a stream of liquid flowing therein will not be diminished by the fact that such lateral extending connections 222 are virtually cut down in diameter by a portion 227 of the pipe connection 216 of the unit. The booster unit of this modification likewise is placed in communication with a source of clean liquid which is introduced under pressure through pipe connections 222 and inlets 221 into the main stream of material flowing in the main pipe line. Suitable pipe sections from the source of liquid to a pump and from the pump to the pipe connections 222, all not shown, are provided as in the case of the other modifications. Moreover, suitable flanges 228 and 229 are provided at each end of the pipe connection 216 to enable detachable connection of the same to the adjacent pipe sections of the main pipe line, which normally carry complementary flanges for effecting this result.

It is to be understood that the appended claims are to be accorded a range of equivalents commensurate in scope with the advance made over the prior art.

We claim:

1. A hydraulic booster system comprising, in combination with an extensible, sectional pipe line for conveying a liquid, a semi-solid or a fluid or other material, a pump for introducing a stream of water under pressure into a stream of material flowing in the pipe line, and a booster unit which is adapted to be detachably connected into said pipe line; said unit consisting of a bell portion of generally spherical shape having a main inlet and a main outlet which are coaxial with one another and with said pipe line; said bell portion also having a relatively narrow side inlet, a flange on said bell portion adjacent to said main inlet, an inner, annular shoulder on said flange, a flanged nipple seated on said inner shoulder of said flange and extending within said bell portion to a point adjacent to said main outlet; said nipple having an internal diameter equal to the internal diameter of said pipe line and being supported on said shoulder coaxially with said pipe line, an integral pipe connection extending coaxially from said main outlet of said bell portion, a flange on said pipe connection for detachably connecting the unit to a section of the pipe line, an integral, laterally extending pipe connection on said bell portion in communication with said side inlet, and a flange on said laterally extending pipe connection for detachably connecting said unit to a supply pipe communicating with said pump.

2. In a hydraulic booster system for combination with the pipe sections of an extensible pipe line, a unitary structure adapted to be interposed and detachably connected between and to adjacent pipe sections of the pipe line, said structure consisting of a pair of main pipe connections having the same internal diameter as the internal diameter of the pipe sections and being adapted to be coaxially aligned therewith for unobstructed passage of material flowing in the pipe line; each of said pipe connections merging into laterally extending pipe connections of less internal diameter than said pipe connections; said laterally extending pipe connections being adapted to be connected to means for supplying water under pressure thereto, and a nipple extending within one of said main pipe connections beyond the juncture of said one main pipe connection with said laterally extending pipe connections and being of less diameter than the diameter of said one main pipe connection whereby an annular space is defined therebetween through which water under pressure from said laterally extending pipe connections may flow into a stream of material flowing in said pipe line.

WILLIAM HERBERT ANDERSON.
NORMAN R. STANTON.